US008983073B1

(12) United States Patent
Peterson et al.

(10) Patent No.: US 8,983,073 B1
(45) Date of Patent: Mar. 17, 2015

(54) METHOD AND APPARATUS FOR RESTRICTING THE USE OF INTEGRATED CIRCUITS

(75) Inventors: Edward S. Peterson, Rio Rancho, NM (US); Jason J. Moore, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 103 days.

(21) Appl. No.: 13/371,223

(22) Filed: Feb. 10, 2012

(51) Int. Cl.
*G06F 21/00* (2013.01)

(52) U.S. Cl.
USPC ............................ 380/277; 713/189; 713/193

(58) Field of Classification Search
CPC ......... G06F 21/51; G06F 21/57; G06F 21/64; G06F 21/76; H04L 9/00
USPC .................................. 380/277; 713/189, 193
See application file for complete search history.

(56) References Cited

U.S. PATENT DOCUMENTS 6,654,889 B1 * 11/2003 Trimberger .................. 713/191
6,904,527 B1 * 6/2005 Parlour et al. ................ 713/189
7,143,295 B1 * 11/2006 Trimberger .................. 713/189
7,752,407 B1 * 7/2010 Langhammer et al. ....... 711/164
8,732,480 B2 * 5/2014 Hashimoto et al. ........... 713/189
2001/0015919 A1 * 8/2001 Kean ............................ 365/200
2005/0210265 A1 * 9/2005 Dombkowski et al. ....... 713/185
2007/0180464 A1 * 8/2007 Dellow et al. .................. 725/31
2008/0061816 A1 * 3/2008 Borkenhagen et al. ........... 326/8
2010/0125739 A1 * 5/2010 Creary et al. ................ 713/189
2011/0087872 A1 * 4/2011 Shah et al. ........................ 713/2
2011/0167278 A1 * 7/2011 Goto et al. .................... 713/193

FOREIGN PATENT DOCUMENTS

JP 2007249507 * 9/2007 ............. G06F 21/24

* cited by examiner

*Primary Examiner* — Chau Le
(74) *Attorney, Agent, or Firm* — LeRoy D. Maunu; Lois D. Cartier

(57) ABSTRACT

Approaches for restricting the use of an integrated circuit (IC) are described. In response to receiving an encrypted configuration bitstream, a cryptographic key is retrieved from an internal memory of the IC and the encrypted configuration bitstream is decrypted using the cryptographic key to produce a decrypted configuration bitstream. A first signature value of the decrypted configuration bitstream is calculated. A second signature value is retrieved from a write-once memory of the IC. In response to the first signature value being different from the second signature value, configuration of the IC with the bitstream is prevented. In response to the first signature value being equal to the second signature value, configuration of the IC with the bitstream is permitted.

12 Claims, 5 Drawing Sheets

METHOD AND APPARATUS FOR RESTRICTING THE USE OF INTEGRATED CIRCUITS

FIELD OF THE INVENTION

One or more embodiments of the invention generally relate to restricting the use of integrated circuits.

BACKGROUND

Programmable integrated circuits may be configured to implement logic required by a developer and thus allow for fast development and realization of circuit designs. In the circuit design process, a target programmable integrated circuit may be configured with a circuit design to verify correct behavior of the circuit on the programmable IC. Wasted manufacturing costs due to faulty design may thus be avoided. Furthermore, programmable ICs allow logic to be reconfigured after deployment to correct newly discovered bugs or add additional functionality.

The reconfigurability of programmable ICs can pose significant vulnerability for many applications. Exploiting the reconfigurable nature, an attacker may attempt to modify a circuit design after deployment to add unauthorized logic (Trojan horse logic) to the general function of the circuit design. For example, an attacker may attempt to modify a programmable IC to bypass security features of a system. As another example, an attacker may modify a programmable IC to retrieve sensitive data that may be stored in or retrieved by the programmable IC during operation. The risks are relevant to applications ranging from military defense systems to commercial banking systems, for example.

Many programmable ICs, such as field programmable gate arrays (FPGAs), use volatile configuration memory that is programmed using configuration data retrieved from an external memory or device every time the programmable IC is powered up. The configuration data loaded from the external memory is referred to as a configuration bitstream. Because the configuration bitstream is stored external to the programmable IC and must be transmitted to a configuration access port, the privacy of the design can be violated by an attacker who monitors the data on the configuration access port, e.g., by putting probes on board traces. Efforts have been made to encrypt designs, but it is difficult to make the design both secure from attackers and easy to use by legitimate users. For example, the Data Encryption Standard (DES) and the more secure Advanced Encryption Standard (AES) algorithms are known for encrypting blocks of data. Cipher block chaining (CBC), in which each block of data is exclusive-ORed (XORed) with the immediately previous block and then encrypted, allows the DES or AES to encrypt a serial stream of data and these are therefore appropriate for encrypting a bitstream for configuring a programmable IC. A key used for encrypting the design must somehow be communicated in a secure way to the programmable IC so that the configuration bitstream may be decrypted and used to configure programmable resources of the programmable IC. Once the programmable IC has been configured using the unencrypted design, the design must continue to be protected from unauthorized discovery.

Some previous encryption approaches store a decryption key in nonvolatile memory in a programmable IC, load an encrypted bitstream into the programmable IC, and then decrypt the encrypted bitstream using the stored key. It is possible, however, to discover the program states of non-volatile memories, and consequently to reverse-engineer proprietary circuit designs. For example, some memory technologies, such as antifuses, are vulnerable to inspection under a microscope. Likewise, memory technologies that rely on stored charge can be attacked by chemically treating memory cells to determine their charge states after removing overlaying metal layers. If the decryption key can be retrieved from non-volatile memory, an attacker may decrypt the circuit design and encrypt a Trojan circuit design using the cryptographic key.

For ease of reference, the process in which the decryption key is stored in the programmable IC may be referred to as initialization. Likewise, for ease of reference, the process of programming the programmable resources of the programmable IC with the decrypted bitstream may be referred to as configuration or startup and such terms may be used interchangeably herein.

Another method stores the cryptographic key in a battery-backed volatile memory of the programmable IC. The battery-backed memory includes anti-tamper measures configured to disconnect the battery from the volatile memory if an attacker attempts to physically access the memory. Once the battery is disconnected, the volatile memory will be cleared, and the cryptographic key will be set to a default value (e.g., 0). This method works well to prevent an attacker from decrypting the bitstream, but does little to prevent an attacker from replacing the bitstream outright. All the attacker needs to do is disconnect the battery to reset the cryptographic key to a value of 0, and program the programmable IC using an unencrypted Trojan bitstream.

One or more embodiments may address one or more of the above issues.

SUMMARY

In one embodiment, a method for restricting the use of an IC is provided. In response to receiving an encrypted configuration bitstream, a cryptographic key is retrieved from an internal memory of the IC and the encrypted configuration bitstream is decrypted using the cryptographic key to produce a decrypted configuration bitstream. A first signature value of the decrypted configuration bitstream is calculated. A second signature value is retrieved from a write-once memory of the IC. In response to the first signature value being different from the second signature value, configuration of the IC with the bitstream is prevented from completing. In response to the first signature value being equal to the second signature value, configuration of the IC with the bitstream is completed.

In another embodiment, a method of configuring a programmable IC is provided. A first signature value of a bitstream generated from a circuit design is calculated. The bitstream of the circuit design is encrypted using an encryption key to produce an encrypted bitstream. The encrypted bitstream is stored in an external memory, relative to the programmable IC. The first signature value is stored in a write-once memory of the programmable IC. A decryption key that corresponds to the encryption key is stored in an internal memory of the programmable IC. At startup of the programmable IC, the programmable IC is used to retrieve the encrypted bitstream from the external memory and decrypt the encrypted bitstream using the decryption key, which results in a decrypted bitstream. A second signature value of the decrypted bitstream is calculated using the programmable IC. In response to the first signature value being different from the second signature value, configuration of the IC with the decrypted bitstream is prevented from completing. In response to the first signature value of the bitstream being equal to the second signature value, configuration of the IC with the decrypted bitstream is completed.

In another embodiment, an article of manufacture is provided. The article includes a non-transitory computer-readable medium having instructions that when executed by a processor cause the processor to generate a bitstream of a circuit design and calculate a signature value of the bitstream. The instructions further cause the processor to encrypt the bitstream of the circuit design and first signature using an encryption key to produce an encrypted bitstream, and store the encrypted bitstream in an external memory. The signature value is also stored in a write-once memory of the programmable IC, and a decryption key, corresponding to the encryption key, is stored in an internal memory of the programmable IC.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings, in which.

DETAILED DESCRIPTION

One or more embodiments provide methods and systems for secure deployment of a circuit design on a programmable IC. A configuration bitstream of a circuit design is externally stored in an encrypted format and decrypted by the programmable IC using an internally stored cryptographic key at startup. However, as discussed above, an attacker may be able to retrieve the cryptographic key, or cause the cryptographic key to be reset, by physically probing the programmable IC. To prevent an attacker from configuring the programmable IC using a Trojan bitstream encrypted with a reset key, one or more embodiments initialize the programmable IC and only allow configuration with a specific bitstream.

In one or more embodiments, a signature may be calculated from various unique identifiers of a particular bitstream, and the signature is stored in a write-once memory (e.g., anti-fuse memory) of the programmable IC during initialization. At startup of the programmable IC, the signature may be calculated from an input configuration bitstream that has been decrypted, and the calculated signature may be compared to the stored signature to verify that the bitstream has not been modified to include Trojan programming. If the calculated signature does not match the stored signature, the bitstream is presumed to contain Trojan programming and countermeasures may be taken.

Figure 1:
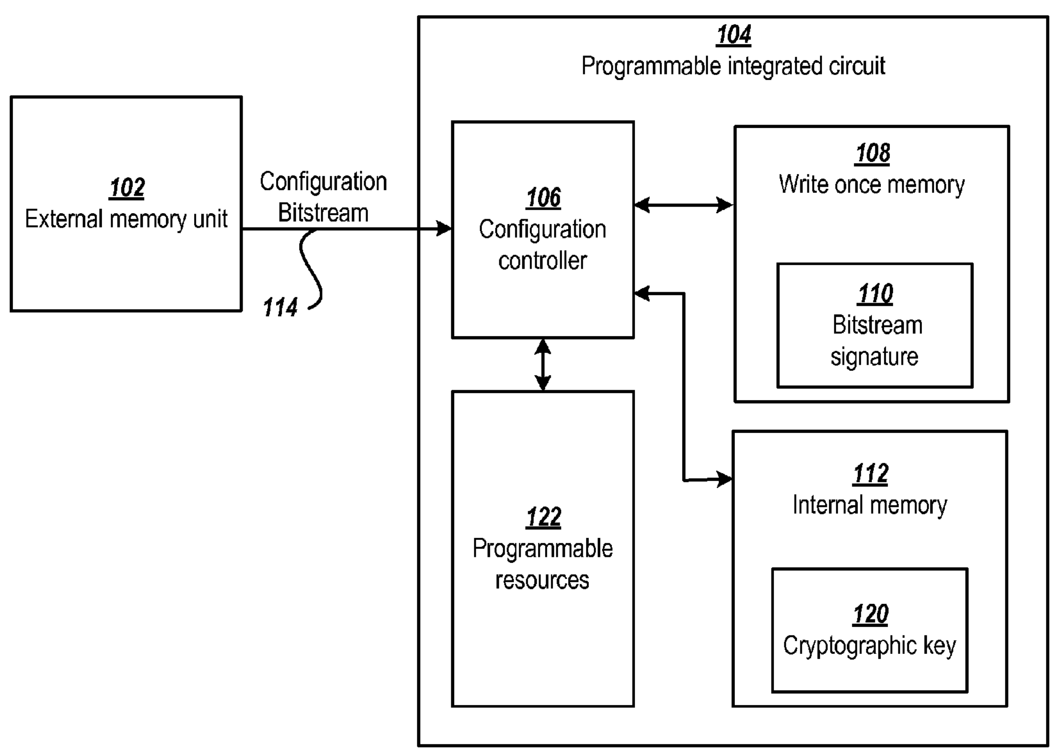
FIG. 1 shows a block diagram of an example programmable integrated circuit configured in accordance with one embodiment of the invention.

FIG. 1 shows a block diagram of an example programmable integrated circuit configured in accordance with one or more embodiments. In an initialization process prior to configuration, a configuration bitstream is encrypted and stored in an external memory 102 that is coupled to the programmable IC 104. As part of the initialization process, a cryptographic key 120 that can be used to decrypt the encrypted bitstream is stored in a nonvolatile memory 112 of the programmable IC 104. A signature of the bitstream is also determined and stored in a write-once memory 108 of the programmable IC.

The programmable IC 104 includes a configuration controller 106 configured to receive an encrypted configuration bitstream 114 at startup from external memory unit 102. The configuration controller 106 is configured to decrypt the encrypted bitstream using the cryptographic key 120 stored in an internal memory 112 of the programmable IC 104. The internal memory may be a non-volatile memory or a battery-backed volatile memory, for example. The configuration controller 106 is also configured to compute, in response to an eFuse setting, for example, a signature of the received configuration bitstream 114 and compare the computed signature to the signature 110 stored in the write-once memory 108. In response to the determined signature of the received configuration bitstream matching a signature 110 stored in a write-once memory 108 of the programmable IC 104, the configuration controller configures programmable resources 122 of the programmable IC 104 using the decrypted configuration bitstream 114. In response to the signatures not matching, the configuration controller is configured to prevent configuration of the programmable resources 122 from completing.

The bitstream signature may be calculated using any of a number of different characteristics of the bitstream. For example, in some embodiments, the signature may comprise bits at predetermined positions in the bitstream. In some other implementations, a signature may be determined by calculating a hash function of all or a portion of the bitstream. A hash function is a one-way function that takes a block of data and generates a hash value as a function of the values of data within the block of data. The hash function is selected such that an accidental or intentional change to the configuration bitstream will change the hash value. While embodiments are not so limited, for ease of explanation the examples and embodiments are primarily described using a hash function to calculate the signature of a bitstream.

Figure 2:
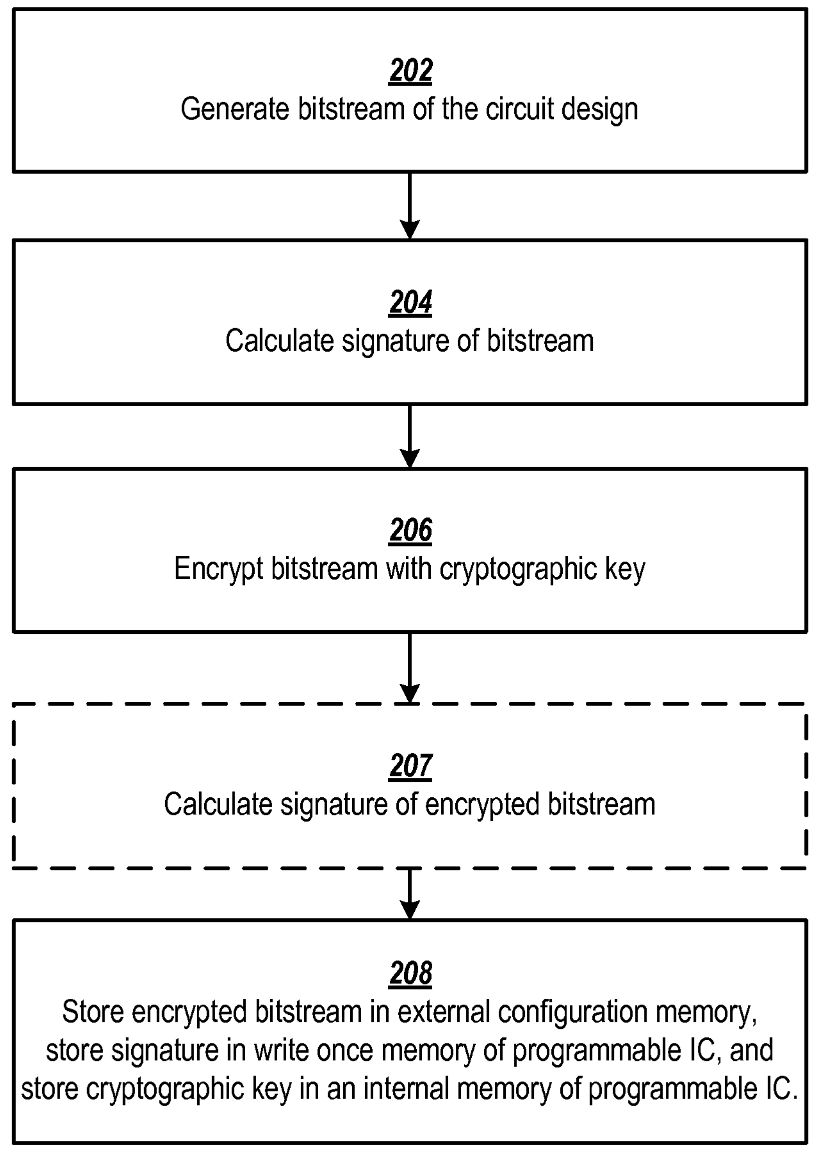
FIG. 2 shows a flowchart of an example process for initialization of a programmable integrated circuit in accordance with one embodiment of the invention.
Figure 3:
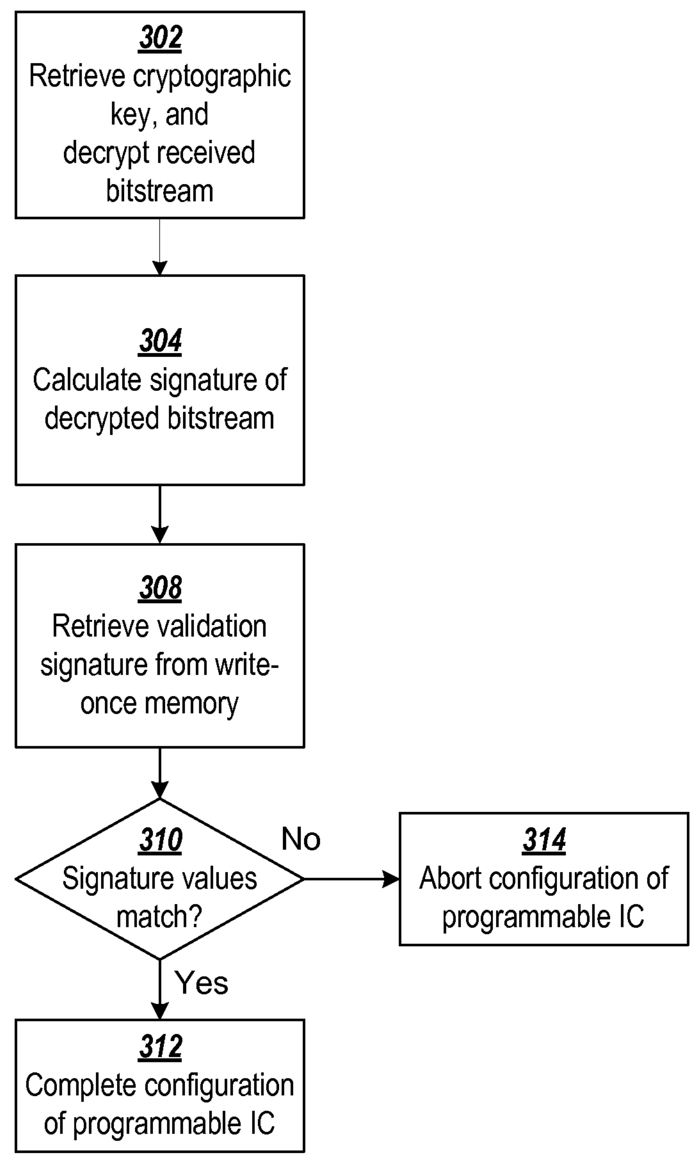
FIG. 3 shows a flowchart of an example process for startup of a programmable integrated circuit in accordance with one embodiment of the invention.

FIGS. 2 and 3 show flowcharts for initialization and startup of a programmable IC. The initialization and startup restricts operation of the programmable IC to an authorized bitstream. FIG. 2 shows a flowchart of an example process for generation of a bitstream and initialization of a programmable IC for restricted operation in accordance with one or more embodiments. The process may be performed, for example, using one or more commercially available software-based design implementation tools that are executable on a general-purpose computer and adapted in accordance with embodiments described herein. The software-based design tool is configured to generate a bitstream of a placed and routed circuit design at block 202. A signature of the bitstream is determined by the design tool at block 204 by calculating a hash of the bitstream. The generated bitstream and hash are encrypted at block 206. Alternatively, in some embodiments the signature of the bitstream may be calculated from the encrypted bitstream at block 207 (in which case block 204 is unnecessary). A programmable IC, which is connected to a computing system executing the design implementation tool is initialized at block 208. As part of the initialization process the encrypted bitstream is stored in external configuration memory, the calculated signature is stored in a write-once memory of the programmable IC, and the cryptographic key needed to decrypt the encrypted bitstream is stored in a battery-backed memory, as described with reference to FIG. 1.

FIG. 3 shows a flowchart of a startup process performed by a programmable IC following the process shown in FIG. 2, in accordance with one or more embodiments. The cryptographic key is retrieved from an internal memory of the programmable IC and a received bitstream is decrypted at block 302. A signature is calculated from the decrypted bitstream input to the programmable IC at process blocks 304. A validation signature is retrieved from a write-once memory of the IC at process block 308. If the calculated signature matches the validation signature (decision block 310), configuration is permitted with the programmable resources of the programmable IC being configured at process block 312. If the bitstream signature does not match the validation signature, at decision block 310, configuration of the programmable IC is prevented at process block 314.

The programmable IC may prevent configuration at block 314 in a number of different ways. In one or more embodiments, the programmable IC may simply reset in response to a discrepancy between the signatures. Reset may be performed by cycling the power or asserting a reset signal of the programmable IC to cause the programmable IC to restart the configuration process. In some other embodiments, other countermeasures may be taken in response to a discrepancy. For example, the programmable IC may delete the cryptographic key or replace the key with a pseudo-random value. As another example, the programmable IC may set a bit of write-once memory that prevents configuration of the programmable IC for any subsequent attempts to configure the programmable IC.

In one or more embodiments, the programmable IC may also be configured to perform one or more countermeasures in response to physical tampering of the programmable IC to prevent an attacker from retrieving the cryptographic key or other sensitive information from the internal memory. In one implementation, sensitive information in the internal memory of the programmable IC may be deleted or otherwise overwritten in response to physical tampering. For example, if the internal memory used to store the cryptographic key is implemented by a battery-backed volatile memory, the programmable IC may be configured to erase the key by disconnecting the battery from the volatile memory in response to detecting physical tampering.

In one or more embodiments, the programmable IC may be configurable to perform startup with or without checking a bitstream signature. For example, in one implementation, a bit of the write-once memory may be used to indicate whether or not a bitstream signature is to be checked. If the bit is set, at startup a configuration controller recalculates and verifies the signature of the bitstream as described with reference of FIG. 3. Otherwise, the bitstream is decrypted and used to configure the programmable IC without verifying the signature of the bitstream.

Figure 4:
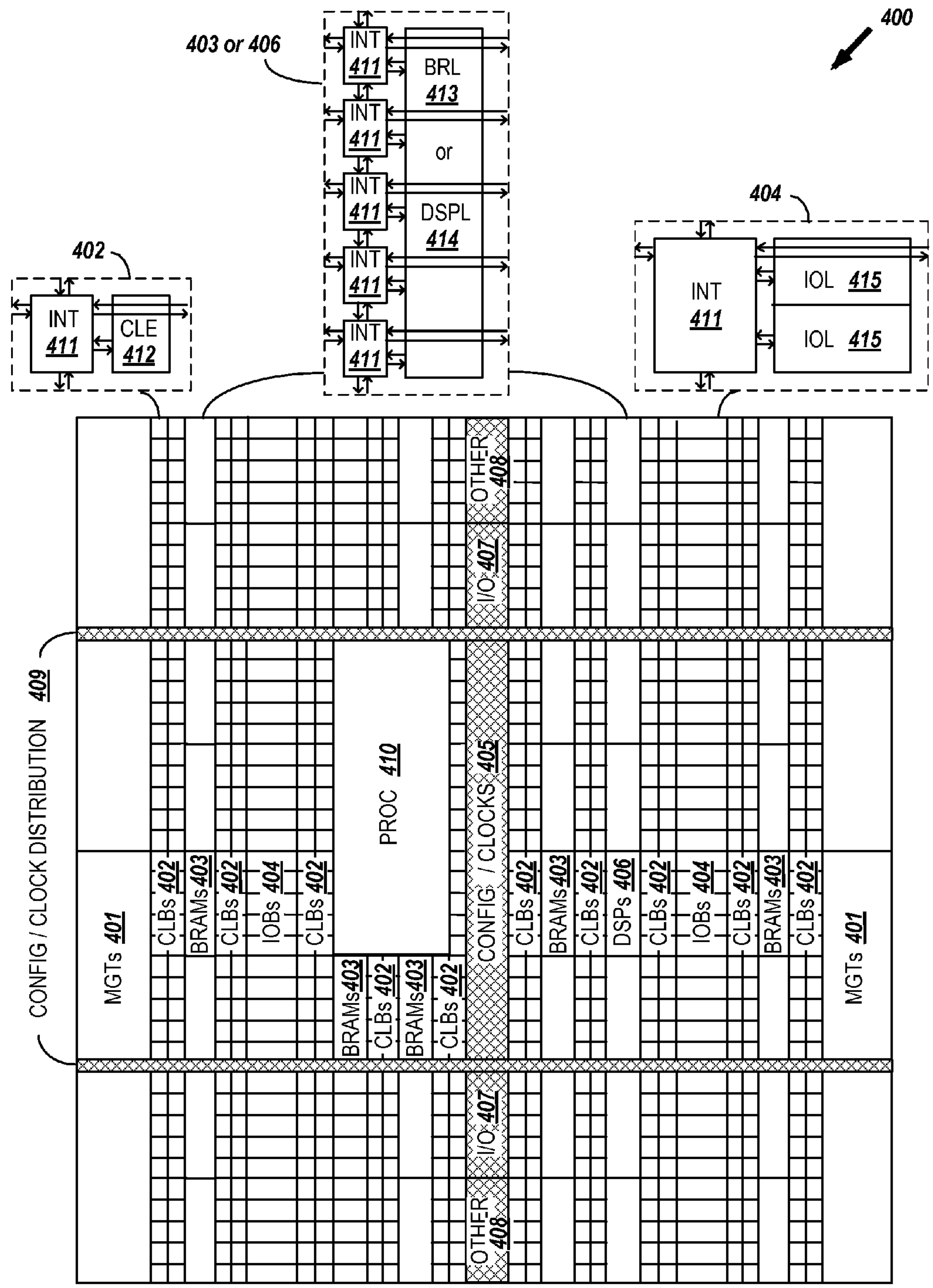
FIG. 4 illustrates a block diagram of a programmable integrated circuit for implementing a circuit design with programmable operating voltage in accordance with various embodiments of the invention.

FIG. 4 is a block diagram of an example programmable IC that may be used as configured for restricted operation in accordance with one or more embodiments. The programmable IC shown in FIG. 4 illustrates an FPGA architecture (400) that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407), e.g., clock ports, and other programmable logic 408 such as digital clock managers, analog-to-digital converters, system monitoring logic, and so forth. Some FPGAs also include dedicated processor blocks (PROC 410) and internal and external reconfiguration ports (not shown).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic plus a single programmable interconnect element INT 411. A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element INT 411. As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

One skilled in the art will recognize that the embodiments described herein are not limited to programmable ICs but may be incorporated into a number of integrated circuits including but not limited to system-on-chip ICs, microprocessors, and processors. For example, a system-on-chip IC may include a controller circuit and an internal memory. The controller circuit may be configured to disable operation of the IC if a signature stored in the internal memory does not match a signature of a program to be executed by the IC.

For a microprocessor or processor embodiment, the processor executes instructions from a program memory. In response to executing one or more instructions from the program memory and a signature verification bit being enabled, the processor determines a signature of the program and retrieves a verification signature from write-once memory. If the signatures match, the processor continues execution of instructions from the program memory. If the signatures do not match, the processor halts execution of instructions from the program memory.

Figure 5:
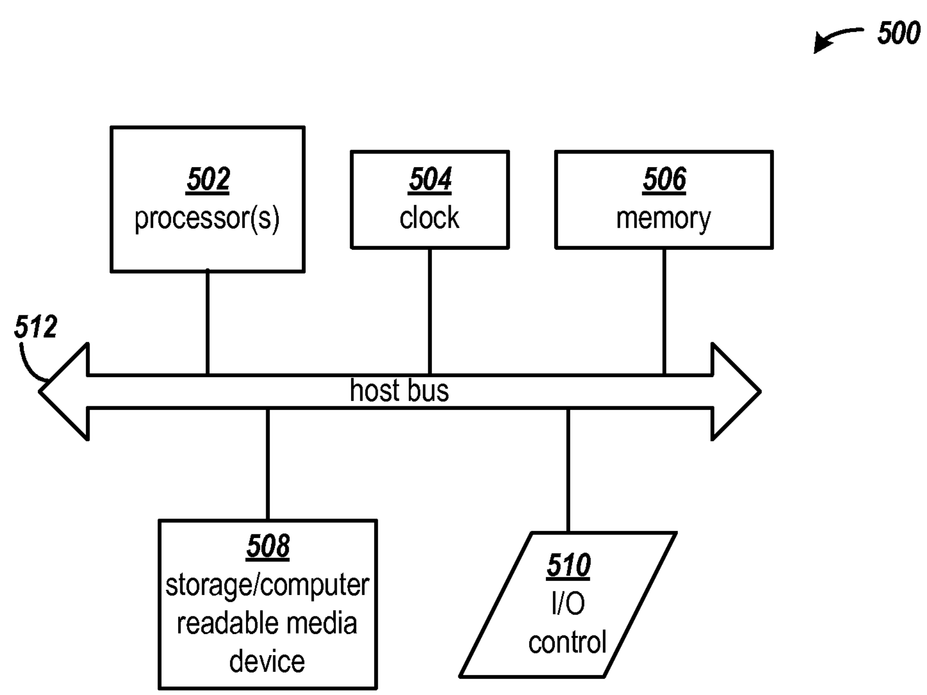
FIG. 5 illustrates a block diagram of a general-purpose processor computing arrangement for implementing the processes described herein.

FIG. 5 is a block diagram of an example computing arrangement, which may be configured to specifically perform the processes described herein using a general-purpose processor. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 500 includes one or more processors 502, a clock signal generator 504, a memory unit 506, a storage unit 508, and an input/output control unit 510 coupled to host bus 512. The arrangement 500 may be implemented with separate components on a circuit board or may be implemented internally within an integrated circuit as a system-on-chip. When implemented internally within an integrated circuit, the processor computing arrangement is otherwise known as a microcontroller.

The architecture of the computing arrangement depends on implementation requirements as would be recognized by those skilled in the art. The processor 502 may be one or more general-purpose processors, or a combination of one or more general-purpose processors and suitable co-processors, or one or more specialized processors (e.g., RISC, CISC, pipelined, etc.).

The memory arrangement 506 typically includes multiple levels of cache memory and a main memory. The storage arrangement 508 may include local and/or remote persistent storage such as provided by magnetic disks (not shown), flash, EPROM, or other non-volatile data storage. The storage unit may be read or read/write capable. Further, the memory 506 and storage 508 may be combined in a single arrangement.

The processor arrangement 502 executes the software in storage 508 and/or memory 506 arrangements, reads data from and stores data to the storage 508 and/or memory 506 arrangements, and communicates with external devices through the input/output control arrangement 510. These functions are synchronized by the clock signal generator 504. The resource of the computing arrangement may be managed by either an operating system (not shown), or a hardware control unit (not shown).

The one or more embodiments are thought to be applicable to restricting the configuration of a variety of devices and integrated circuits. Other aspects and embodiments of the present invention will be apparent to those skilled in the art from consideration of the specification and practice of the invention disclosed herein. It is intended that the specification and illustrated embodiments be considered as examples only, with a true scope and spirit of the embodiments being indicated by the following claims.

What is claimed is:

1. A method for restricting the use of an integrated circuit (IC), comprising:
- in response to receiving an encrypted configuration bitstream:
  - retrieving a cryptographic key from an internal memory of the IC;
  - wherein the internal memory is a battery-backed volatile memory;
  - decrypting the encrypted configuration bitstream using the cryptographic key to produce a decrypted configuration bitstream;
  - calculating, by a processor, a first signature value of the decrypted configuration bitstream;
  - wherein calculating the first signature value includes calculating a first hash value of the decrypted configuration bitstream;
  - retrieving a second signature value from a write-once memory of the IC;
  - wherein the second signature value corresponds to a second hash value of the decrypted configuration bitstream; and
  - wherein the write-once memory is an anti-fuse memory;
- in response to the first signature value being different than the second signature value, preventing configuration of the IC with the bitstream;
- wherein preventing configuration of the IC with the bitstream includes deleting the cryptographic key from the internal memory by disconnecting battery power to the battery-backed volatile memory; and
- in response to the first signature value being equal to the second signature value, permitting configuration of the IC with the bitstream.

2. The method of claim 1, wherein:
- the encrypted configuration bitstream includes configuration data and a third hash value of the configuration data;
- in response to the third hash value being different than the second hash value, preventing configuration of the IC with the bitstream from completing.

3. The method of claim 1, wherein:
- the encrypted configuration bitstream includes configuration data and a third hash value of the configuration data; and
- further comprising, in response to the third hash value being different than the first hash value, preventing configuration of the IC with the bitstream from completing.

4. The method of claim 1, wherein preventing configuration of the IC with the bitstream includes resetting the IC.

5. The method of claim 1, wherein preventing configuration of the IC with the bitstream includes setting a bit of write-once memory to permanently disable the IC.

6. The method of claim 1, wherein:
- the calculating of the first signature value and retrieving the second signature value are performed in response to a first value of a bit in the write-once memory; and
- the calculating of the first signature value and retrieving the second signature value are not performed in response to a second value of the bit in the write-once memory.

7. A method of configuring a programmable integrated circuit (IC), comprising:
- calculating a first signature value of a bitstream generated from a circuit design;
- wherein calculating the first signature value includes calculating a first hash value of the bitstream;
- encrypting the bitstream using an encryption key to produce an encrypted bitstream;

storing the encrypted bitstream in an external memory, the external memory being external to the programmable IC;

storing the first signature value in a write-once memory of the programmable IC;

wherein the write-once memory is an anti-fuse memory;

storing a decryption key that corresponds to the encryption key in an internal memory of the programmable IC;

wherein the internal memory is a battery-backed volatile memory;

at startup of the programmable IC, using the programmable IC to:

retrieve the encrypted bitstream from the external memory;

decrypt the encrypted bitstream using the decryption key to produce a decrypted bitstream;

calculate a second signature value of the decrypted bitstream;

wherein calculating the second signature value includes calculating a second hash value of the decrypted bitstream;

in response to the first signature value being different from the second signature value, prevent configuration of the IC with the decrypted bitstream;

wherein preventing configuration of the IC with the bitstream includes deleting the cryptographic key from the internal memory by disconnecting battery power to the battery-backed volatile memory; and in response to the first signature value of the bitstream being equal to the signature hash value, permit configuration of the IC with the decrypted bitstream.

8. The method of claim 7, wherein encrypting the bitstream of the circuit design to produce the encrypted bitstream includes:

appending the first signature value to the bitstream to produce intermediate data; and encrypting the intermediate data using the cryptographic key to produce the encrypted bitstream.

9. The method of claim 7, wherein preventing configuration of the programmable IC with the bitstream includes resetting the programmable IC.

10. The method of claim 7, wherein preventing configuration of the programmable IC with the bitstream includes:

setting a bit of the write-once memory; and at startup of the programmable IC, using the programmable IC to abort startup of the programmable IC in response to the bit of the write-once memory being set.

11. The method of claim 7, wherein:

the storing of the first signature value in a write-once memory of the programmable IC includes setting an indication bit of the write-once memory; and the calculating of the second signature value is performed in response to the indication bit being set in the write-once memory.

12. A system, comprising:

a processor;

a memory arrangement coupled to the processor via a bus, wherein the memory arrangement is configured with instructions that when executed by a processor cause the processor to perform operations including:

calculating a first signature value of a bitstream of a circuit design;

wherein calculating the first signature value includes calculating a first hash value of the bitstream;

encrypting the bitstream and first signature using an encryption key to produce an encrypted bitstream;

storing the encrypted bitstream in an external memory, the external memory being external to a programmable integrated circuit (IC);

storing the first signature value in a write-once memory of the programmable IC;

wherein the write-once memory is an anti-fuse memory; and storing a decryption key that corresponds to the encryption key in an internal memory of the programmable IC;

wherein the internal memory is a battery-backed volatile memory;

wherein the instructions further cause the processor to configure the programmable IC to perform a signature check at startup of the programmable IC, the signature check including:

retrieving the encrypted bitstream from the external memory;

decrypting the encrypted bitstream using the decryption key to produce a decrypted bitstream;

calculating a second signature value from the decrypted bitstream;

wherein calculating the second signature value includes calculating a second hash value of the decrypted bitstream;

in response to the first signature value being different from the second signature value, preventing configuration of the programmable IC with the decrypted bitstream;

wherein preventing configuration of the IC with the bitstream includes deleting the cryptographic key from the internal memory by disconnecting battery power to the battery-backed volatile memory; and in response to the first signature value of the bitstream being equal to the second signature value, permitting configuration of the programmable IC with the decrypted bitstream.

* * * * *